US00RE48026E

(19) United States
(12) Reissued Patent
Beamon et al.

(10) Patent Number: US RE48,026 E
(45) Date of Reissued Patent: Jun. 2, 2020

(54) HYDRAULIC SWITCH MACHINE FOR RAILROADS

(71) Applicant: VOSSLOH SIGNALING USA, INC., Charlotte, NC (US)

(72) Inventors: Donald Coy Beamon, Thornton, TX (US); Dilson Santos Rodrigues, Robinson, TX (US); Rick Presley, Bremond, TX (US)

(73) Assignee: VOSSLOH SIGNALING USA, INC., Charlotte, NC (US)

(21) Appl. No.: 15/782,737

(22) Filed: Oct. 12, 2017

Related U.S. Patent Documents

Reissue of:
(64) Patent No.: 9,156,479
Issued: Oct. 13, 2015
Appl. No.: 12/583,988
Filed: Aug. 28, 2009

U.S. Applications:
(63) Continuation-in-part of application No. 12/217,184, filed on Jul. 2, 2008, now abandoned, which is a continuation of application No. 11/028,753, filed on Jan. 3, 2005, now Pat. No. 7,416,159.

(60) Provisional application No. 60/534,088, filed on Jan. 2, 2004.

(51) Int. Cl.
*B61L 5/10* (2006.01)
*B61L 5/04* (2006.01)

(52) U.S. Cl.
CPC ..... *B61L 5/102* (2013.01); *B61L 5/04* (2013.01); *B61L 5/10* (2013.01); *B61L 5/107* (2013.01)

(58) Field of Classification Search
None
See application file for complete search history.

(56) References Cited

U.S. PATENT DOCUMENTS

| | | | | | |
|---|---|---|---|---|---|
| 2,168,790 | A * | 8/1939 | Bone | 246/291 | |
| 3,363,097 | A | 1/1968 | Wilhelm | | |
| 3,691,371 | A * | 9/1972 | Hylen | 246/393 | |
| 4,022,409 | A * | 5/1977 | Ensink et al. | 246/218 | |
| 4,023,078 | A | 5/1977 | Olliges et al. | | |
| 5,375,796 | A * | 12/1994 | Turner et al. | 246/257 | |
| 5,417,392 | A * | 5/1995 | Wyatt | B61L 5/04 | 246/257 |
| 5,531,408 | A * | 7/1996 | Wechselberger | 246/257 | |
| 5,772,157 | A * | 6/1998 | Lauck et al. | 246/257 | |
| 5,775,647 | A * | 7/1998 | Wyatt | 246/258 | |
| 6,168,120 | B1 * | 1/2001 | Pease | 246/405 | |
| 6,186,448 | B1 * | 2/2001 | Wydotis et al. | 246/220 | |
| 6,270,041 | B1 * | 8/2001 | Helas et al. | 246/448 | |
| 6,296,208 | B1 * | 10/2001 | Franke | 246/220 | |
| 6,382,567 | B2 * | 5/2002 | Franke | 246/476 | |
| 6,484,974 | B1 * | 11/2002 | Franke et al. | 246/476 | |
| 6,568,641 | B2 * | 5/2003 | Hoyer et al. | B61L 5/04 | 246/220 |
| 6,585,194 | B1 * | 7/2003 | Brushwood | 246/220 | |
| 6,588,710 | B1 * | 7/2003 | Taylor | 246/220 | |
| 6,688,559 | B1 * | 2/2004 | Brushwood | 246/220 | |

(Continued)

*Primary Examiner* — Glenn K Dawson
(74) *Attorney, Agent, or Firm* — Michael G. Monyok

(57) ABSTRACT

Provided is a hydraulic railroad switch machine that incorporates a lock-spring assembly, a point-detection and display system, a connector rod assembly, and a hydraulic system to overcome disadvantages associated with throw-out linkages.

9 Claims, 12 Drawing Sheets

(56) References Cited

U.S. PATENT DOCUMENTS

| | | | | |
|---|---|---|---|---|
| 7,257,471 | B2 * | 8/2007 | Kornick | B61L 3/127 246/182 C |
| 7,416,159 | B2 * | 8/2008 | Beaman | B61L 5/067 246/219 |
| 7,577,502 | B1 * | 8/2009 | Henry et al. | B61L 5/102 246/218 |
| 7,699,272 | B2 * | 4/2010 | Arnold | 246/220 |
| 7,753,318 | B2 * | 7/2010 | Wagner et al. | 246/220 |
| 7,913,956 | B2 * | 3/2011 | Mugg | 246/393 |
| 2009/0072097 | A1 * | 3/2009 | Arnold | 246/220 |

* cited by examiner

TABLE 1

| Parameter | Set To | Description | Explanation |
|---|---|---|---|
| 06 | 00 | Self Restore | Sets self restore function to be controlled by MC12 |
| 07 | 05 | Restore Time (sec) | Seconds after falling edge of MC13 to controlswitch normal for self restore |
| 08 | 00 | Restore Time (min) | Minutes after falling edge of MC13 to controlswitch normal for self restore |
| 30 | 00 | Toggle function | Disables toggle input MC2 |
| 31 | 01 | Normal/Reverse Function | Enables inputs MC1 and MC3 |
| 44 | 01 | Throw Disable MC8 | Set input MC8 to act as a normally open contact |
| 45 | 00 | Throw Disable MC4 | Set input MC4 to act as a normally closed contact |
| 47 | 01 | Third Voice Enable | Sets DTMF 112 to transmit out of correspondence message when necassary |
| 63 | 90 | Third Voice Interval | Sets DTMF 112 to transmit out of correspondence message every 90 minutes when switch 108 is out of correspondence |

Fig 13

HYDRAULIC SWITCH MACHINE FOR RAILROADS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The invention is related to, is a Continuation-in-Part of, and claims priority from U.S. patent application Ser. No. 12/217,184, filed on Jul. 2, 2008 (now Abandoned), which is a Continuation of U.S. patent application Ser. No. 11/028,753 filed on Jan. 3, 2005 (now U.S. Pat. No. 7,416,159 issued on Aug. 26, 2008), which claims priority to U.S. Provisional Patent Application No. 60/534,088 filed on Jan. 2, 2004, all having common inventor Beaman.

FIELD OF INVENTION

The invention relates generally to railroad infrastructure, and more particularly to railroad switches.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Movement of railway vehicles to and from railroad tracks is accomplished by the use of switches stands to affect the movement of the switch points. For example, the use of mainline hand-operated switches is governed by federal regulation 49CFR236.410. However, there is a need to provide switching that provides greater reliability and safety than the existing switching such as those that use throw-out linkages. The present invention provides these advantages.

BRIEF DESCRIPTION OF THE DRAWINGS AND TABLES

Various aspects of the invention, as well as an embodiment, are better understood by reference to the following detailed description. To better understand the invention, the detailed description should be read in conjunction with the drawings and tables, in which:

FIG. 1 is a block schematic 100 showing a system for a remotely controlled switch.

FIG. 2 is a block diagram of MCU.

FIG. 3 is a block schematic that shows one embodiment of the track circuits.

FIG. 4A is a diagram depicting a power-operated switch.

FIG. 4B is a diagram that illustrates the application and modifications of the power-operated switch.

FIG. 5 illustrates the application of an exemplary switch circuit controller.

FIG. 6 is a diagram depicting PLC inputs.

FIG. 7 is a diagram depicting PLC outputs.

FIG. 8 block-diagram of a switch machine.

FIG. 9 illustrates a preferred layout of the switch machine.

FIG. 10 is an isolated face-on view of a lock spring assembly.

FIG. 11 shows selected top-down detail of a manifold assembly.

FIG. 12 illustrates isolated detail of a mechanical target drive linkage.

FIG. 13 illustrates Table 1, which shows user-controlled parameters.

Mnemonics List provides code for implementing one embodiment of the invention.

SELECTED ABBREVIATIONS & ACRONYMS

AC—Alternating Current
B12—Positive (+) 12 volts DC power.
DC—Direct Current
DTMF—Dual-Tone Multi-Frequency
GLC—Global Logic Controller
HPU—Hydraulic Power Unit
LED—Light Emitting Diode
MOW—Maintenance of Way
N12—Negative (−) 12 volts DC power from the battery.
NWK—Wire tag indicating the normal proximity sensor indication
NWZ—Wire tag indicating normal directional control valve
PROX—Inductive proximity sensor
RWK—Wire tag indicating reverse proximity sensor indication
RWZ—Wire tag indicating reverse directional control valve
SPPI—Switch Point Position Indicator
VAC—Volts Alternating Current
VDC—Volts Direct Current
VHF—Very High Frequency

EXEMPLARY EMBODIMENT OF A BEST MODE

The invention is an electrically controlled, hydraulically actuated power switch machine employing hydraulic actuation and spring holding for smoothly throwing any size switch point in a railroad. It incorporates a direct-drive design and an adjustable spring holding force. It is suited for both mainline and yard applications and is designed to integrate easily with modern automated control systems, and is also employable in dark territory.

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

As will be understood by those of ordinary skill in the art, various structures and devices are depicted in block diagram form in order to avoid unnecessarily obscuring the invention. As used, herein and the accompanying drawings, B12 refers to positive 12 volts, and N12 refers to negative 12 volts. Additionally the term "set" refers to the application of 12 volts (B12), while the term "reset" refers to the removal of 12 volts.

Some methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to transport the invention. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise.

DESCRIPTION OF THE DRAWINGS

The invention is described in the context of employment in dark territory. However, it is understood that the invention has application in mainline and yard applications as well, as is understood by those of ordinary skill in the art.

System Overview

Figure 1:
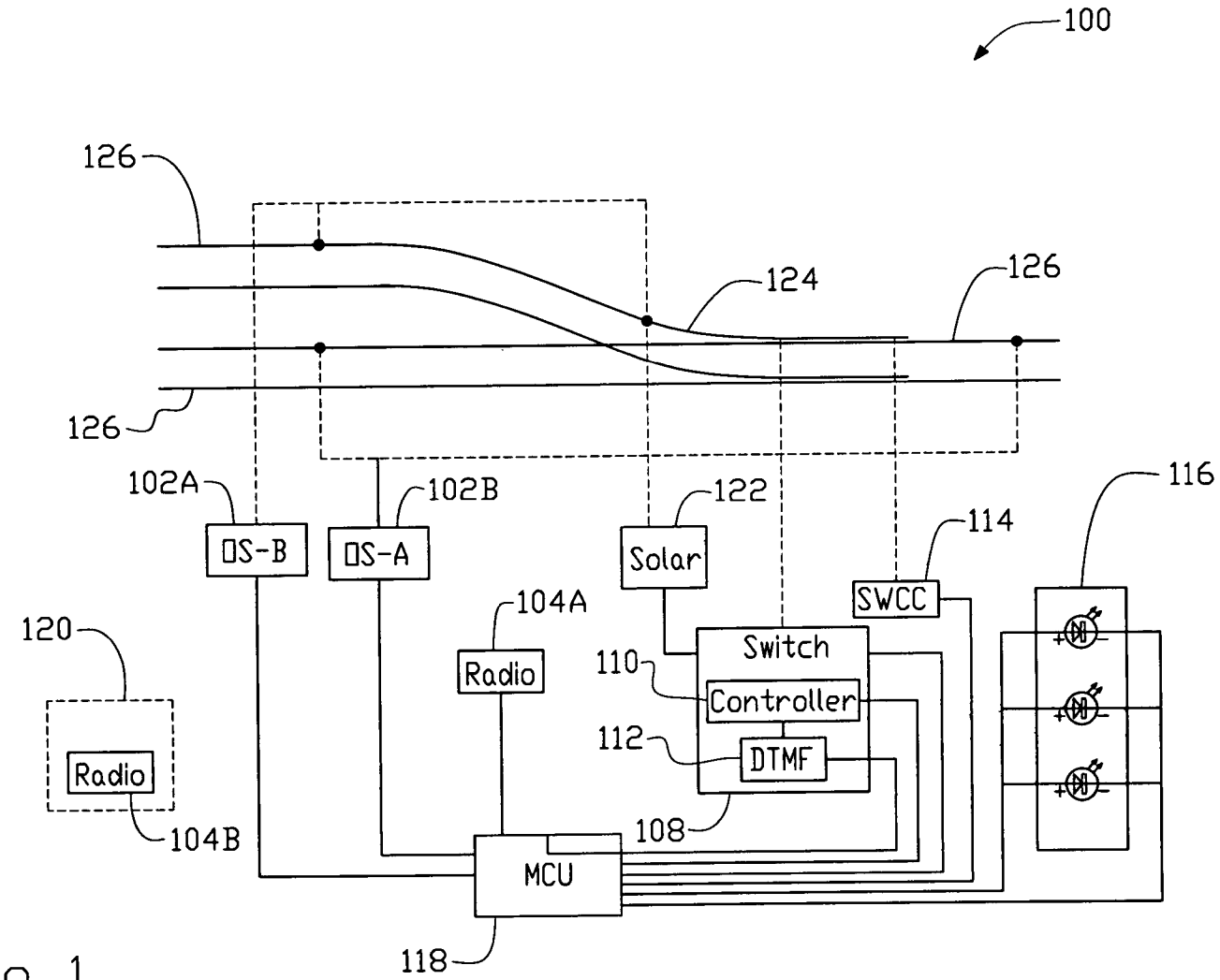
FIG. 1 is a block schematic 100 showing a system for a remotely controlled switch. According to one embodiment, a switch 108 is mechanically coupled to a set of switch points (points) 124. It is understood that switch points, rather than being points in a mathematical sense, are the terminal portion of a railroad track. In the present example, the switch points 124 are the terminal portion of the railroad tracks 126 that move. Operation of the switch 108 moves the points 124 to either the normal or reverse positions. The preferred switch being a power operated spring switch such as model LP3000 manufactured by General Electric Transportation Systems™ or a similar system known to those of skill in the art. However, any power-operated switch manufactured for railway applications may be used and the invention is not limited to any particular switch. Switch 108 contains a controller 110 and a Dual Tone Multiple Frequency (DTMF) module 112 (a DTMF module decodes tones and executes commands based on the tones and/or the sequence of those tones). Controller 110 governs and controls the operations of the switch. DTMF module 112 provides a method of command input and status output (this is in addition to the serial and electro-mechanical methods provided by controller 110). Any external power source may be used including but not limited to any AC power source, any DC power source (along with the appropriate converters), or a remote power source such as a solar charging system 122.

A switch circuit controller (SWCC) 114 is connected to the points 124 to provide a secondary position indication. Additionally, two "vital" track circuits 102 are provided: On-Switch circuit 102A (OS-A), and On-Switch circuit 102B (OS-B) (keep in mind that "vital" herein is a term of art, and does not mean that an item is "vital to the invention"). The circuits 102A and 102B detect the presence of a train on a short track segment. Any vital track circuit or equivalent manufactured for railway applications may be used. Additionally, the track circuits, as used, provide a zone of protection around and including the switch points that includes the facing point side and trailing point sides on both the normal and reverse sides of the switch. "Facing point" and "trailing point" are terms known in the art; but for the benefit of the general reader, the facing point direction is the direction a train takes when moving into a switch from facing point to trailing point, and the trailing point direction is the direction a train takes when moving into a switch from trailing point to facing point.

The invention is not limited to a particular number of On-Switch circuits, but includes any number and style of circuits that provide the required zone of protection. In addition, it is also understood in the art that in the present context, the term "Sheet" and "Segment" are interchangeable with the term "Switch." These circuits can include, but are not limited to, AC circuits, DC circuits, and wheel detectors. Of course, it is understood in the art that the specific selection, design, and application of track circuits are dependent on environmental and operational factors.

A plurality of switch position indicators 116 are provided that, in one embodiment, each contain a three-color single aspect display mechanism for visually displaying the status of the switch points 124. For example, in one embodiment, the colors may be RED, YELLOW, and GREEN. The display colors may be provided for by any mechanism approved for railway use and the invention includes but is not limited to LED displays and filament displays. Two indicators 116 provide a visual indication of the status of the switch points 124 to railway vehicles with the indicators 116 positioned in close proximity to switch 108. The first indicator 116 provides indications to railway vehicles approaching the facing points 124 and the second indicator provides indications to railway vehicles approaching the trailing points 124. The actual placement of the indicators 116 is dependant on environmental considerations.

A communication system is provided that is comprised of a wireless communication device, such as radios 104A and 104B: where radio 104A couples to the Main Control Unit (MCU) 118, and radio 104B is provided for railway vehicles and railway personnel (radios 104A and 104B preferably have DTMF capabilities). Of course, other wireless communication devices interchangeable with radios are usable as will be readily apparent to those of skill in the art upon reading the present disclosure. The communication system is utilized, at least in part, to provide remote control and indication messages. Additionally, the invention is not limited to any particular communication means or method and can include but is not limited to: digital communications, analog communications, copper, fiber optics, Local Area Networks (LAN), or Wide Area Networks (WAN), for example. According, MCU 118 is provided to allow for the safe operation of the switch.

Of course, this section discusses exemplary portions of an exemplary embodiment of the invention. It is understood that equivalent portions, sometimes having equivalent devices and means, may be substituted, and are readily apparent to those of ordinary skill in the art after reading this disclosure.

Main Control Unit

Figure 2:
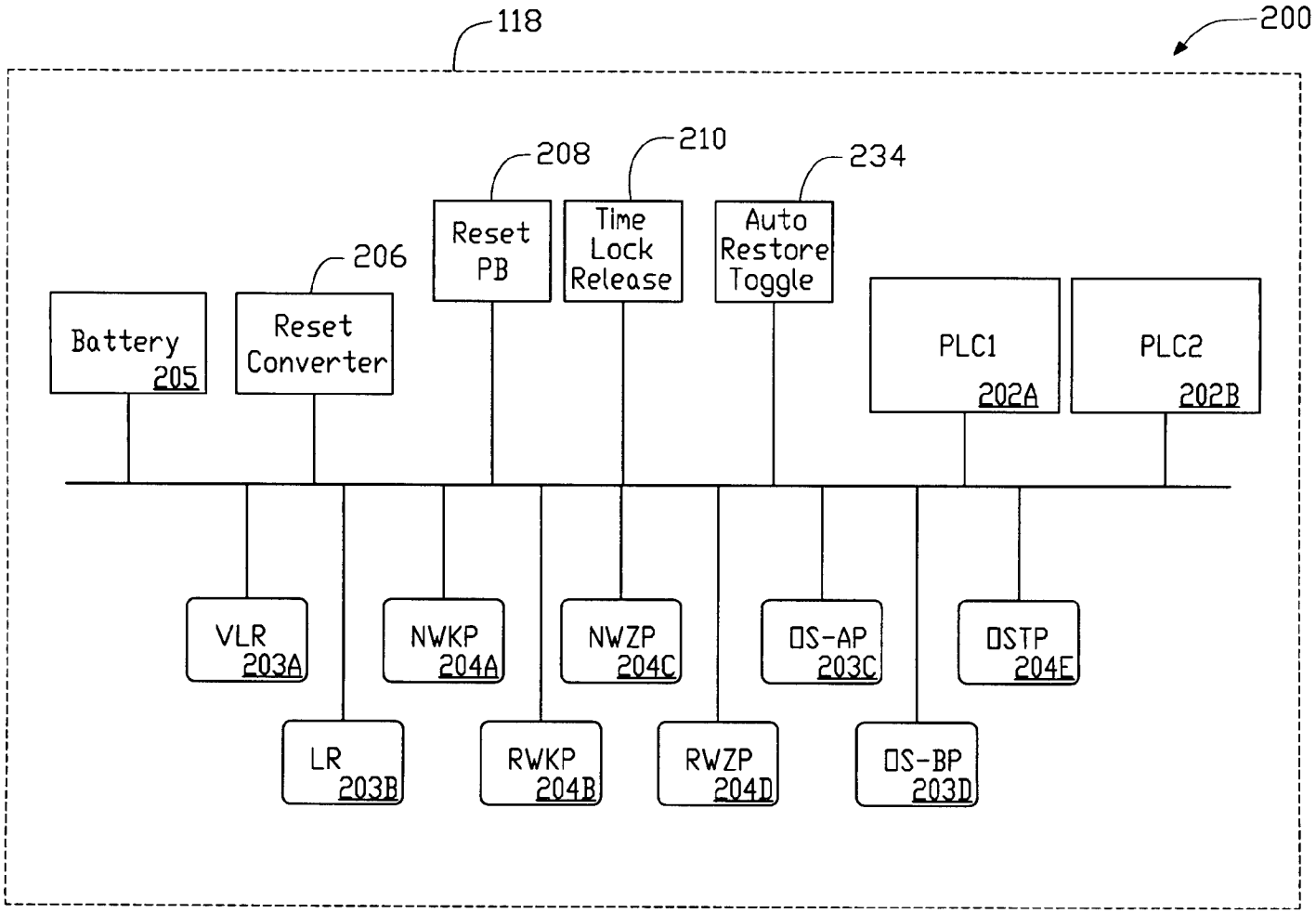

FIG. 2 is a block diagram of MCU 118. MCU 118 contains two programmable logic controllers (PLC) 202A and 202B. Programmable logic controllers 202 may be implements as Micro3C™ model number FC2AC24A4C manufactured by the IDEC™ Corporation. However, any programmable logic controller with similar operating characteristics, such as a Digital Signal Processor (DSP), may be used, and the invention is not limited to any particular programmable logic controller. Additionally, programmable logic controllers (PLCs) 202 may be programmed according to a ladder logic or mnemonic method, for example.

MCU 118 contains four vital relays 203 and five non-vital relays 204. Vital relays 203 are model 4000004 manufactured by Safetran™. Relays 204 are non-vital relays model RH4B-UL manufactured by the IDEC Corporation™. Of course, these relays are exemplary and any equivalent relay providing similar operating characteristics may be used.

Relays 204A-E are used to repeat the status of various conditions and states of the system. Contacts for relays 204 are used as inputs to logic controllers 202 and as part of logic circuits. Relay 204A is the normal position repeater (NWKP). Relay 204B is the reverse position repeater (RWKP). Relay 204C is the normal control repeater (NWZP). Relay 204D is the reverse control repeater (RWZP). Relay 204E is the track circuit repeater (OSTP). Relay 204E represents the logical AND of track circuits 102 in the system.

Vital relays (relay) 203 provide(s) for various functions within the MCU 118. Each relay 203 operates on a closed-circuit principal whereby the relay coils are energized when denoting a least restrictive state. Relay 203A is a Vital Lock Relay (VLR) that operates as a master relay. Relay 203A is set when the system is operating correctly. A failure of the system causes power to be removed from relay 203A thereby preventing operation of the system. Relay 203B is the Lock Relay (LR) that operates as a locking mechanism for the system. Power is removed from relay 203B under various conditions including, but not limited too, the presence of a railway vehicle as determined by track circuits 102. Relay 203C is the track circuit 102A repeater (OS-AP). Relay 203C repeats the status of track circuit 102A and is used for input to logic controllers 202. Relay 203D is the track circuit 102B repeater (OS-BP). Relay 203D repeats the status of track circuit 102A and is used for input to logic controllers 202.

The invention is not restricted to any particular power source and may include but is not limited to converted AC power, or external DC power. In one embodiment a battery 205 is charged by a solar charger 122.

According to an embodiment a DC-DC converter 206 is provided to convert the 12-volt battery 205 power to the 24 volt power required to power the programmable logic controllers 202. However, the use of a converter depends on the programmable logic controllers 202 utilized (the invention is not limited to any particular converter). The MCU 118 comprises, in one embodiment, a single pole momentary push button switch (PB) 208. PB 208 is used to provide a reset input into programmable logic controllers 202. Any single pole momentary push button may be used as is apparent to those of skill in the art, and the invention is not limited to any particular pushbutton. MCU 118 comprises two single pole single throw momentary push buttons PB 208, part number DS-126 manufactured by Standard Manufacturing™. However, any push button switch or equivalent may be used and the invention is not limited to any particular type.

Of course, this section discusses exemplary portions of an exemplary embodiment of the invention. It is understood that equivalent portions having equivalent devices and means may be substituted, and are readily apparent to those of ordinary skill in the art after reading this disclosure.

Track Circuits

Figure 3:
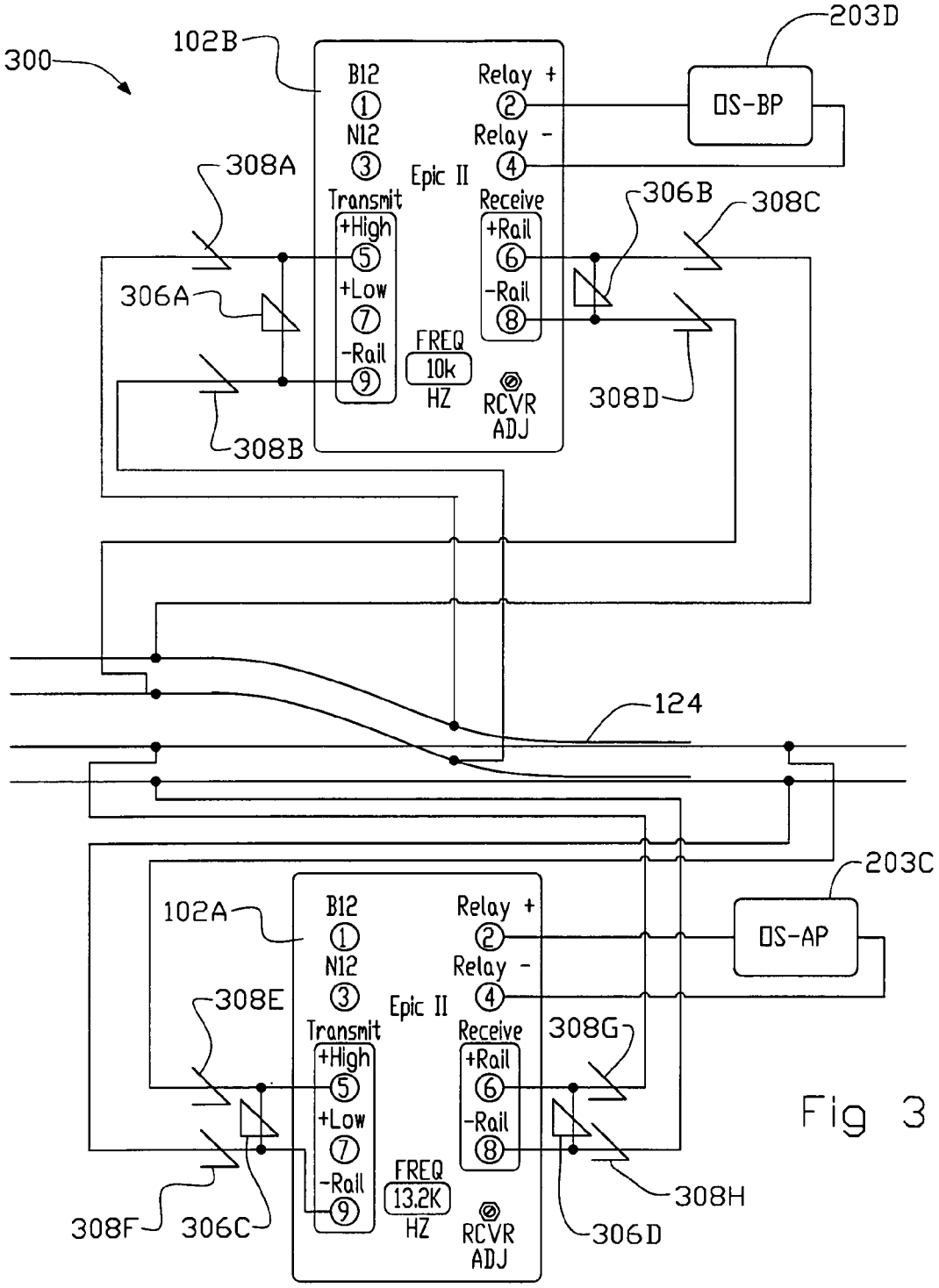

Track circuits prevent unwanted/undesirable switch operation, and re-enable switch operation. FIG. 3 is a block schematic 300 that shows one embodiment for the track circuits 102. Track circuit 102A is connected to the main rails on both the facing point side and trailing point side of the points 124. Each leg, transmit and receive, is preferably protected by lightning arrestors 308, such as part number 022585-3X manufactured by Safetran Systems™. Additionally, each transmit and receive pair of wires is conditioned by a track equalizer 306 such as part number 022700-1X manufactured by Safetran Systems™. Track circuit 102A operates by detecting an open circuit (or shunt) across the main rails. In the un-shunted state (or closed circuit state) track circuit 102A energizes relay outputs 2 and 4, thereby driving the coil of relay OS-AP 203C. Track circuit 102B is structured and operates in a similar manner, as is readily apparent to those of skill in the art.

Of course, this section discusses an exemplary portion of an exemplary embodiment of the invention. It is understood that an equivalent portion having equivalent devices and means may be substituted, and are readily apparent to those of ordinary skill in the art after reading this disclosure.

Power Switch

Figure 4A:
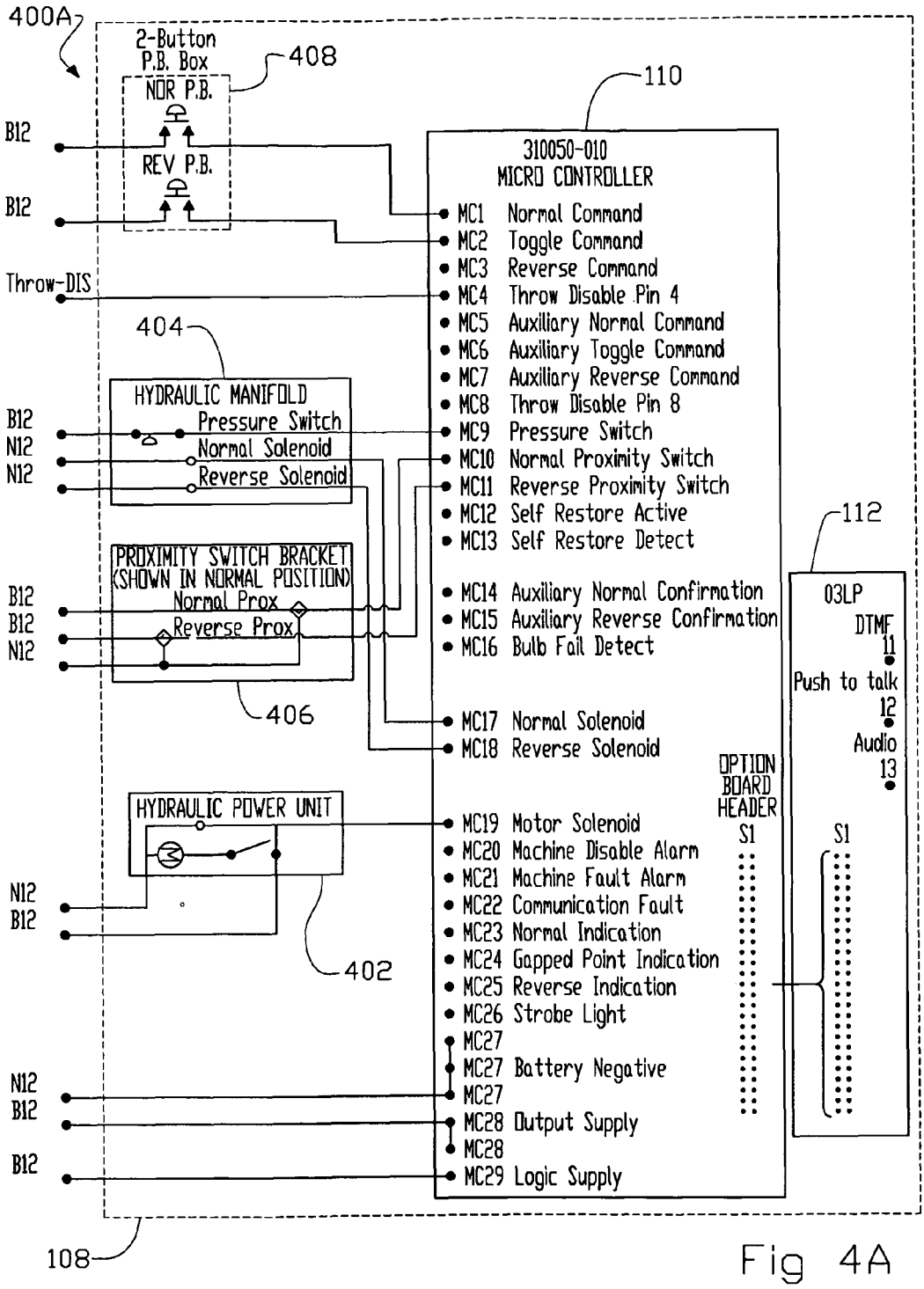

In order to utilize the preferred switch 108, it should be modified. FIG. 4A is a diagram depicting a power-operated switch. The switch is comprised of a hydraulic power unit 402, a hydraulic manifold 404, and a set of proximity switches 406, along with controller 110 and DTMF module 112. Switch 108 operates by utilizing hydraulic force supplied by hydraulic power unit 402 to operate mechanical links to points 124. The direction of movement is determined by manifold 404 where the normal and reverse solenoids are controlled by controller 110. Controller 110 is configured to receive control inputs from pushbuttons 408 and DTMF module 112. Controller 110, when receiving a normal position control input, sets output MC17. Controller 110, when receiving a reverse position control input, sets output MC18. Additionally, hydraulic unit 402 is operated by controller 110 by setting output MC19. MC19 will remain set until position inputs MC10 or MC11 match the desired control position or a pressure limit is reached, set as input MC9. Inputs MC10 and MC11 are set by proximity switches 406.

Upon achieving correspondence between the desired control position and the indicated position DTMF 112 sets output 12 PTT, where PTT is used to key radio 104A. Additionally, DTMF 112 sets output 13 AUDIO where AUDIO is used as a "line in" for radio 104A and where output 13 AUDIO comprises pre-recorded messages. DTMF 112 is configured with one message for normal correspondence, one message for reverse correspondence, and one message for out of correspondence. If a control by controller 110 is received and switch 108 fails to achieve correspondence, as determined by controller 110, DTMF 112 sets output 12 PTT and output 13 AUDIO where the message is a prerecorded message indicating an "out of correspondence" condition.

Additionally, controller 110 has two inputs MC4 and MC8 that are used to prevent the setting of outputs MC17, MC18 and MC19 thereby preventing control of switch 108. Inputs MC4 and MC8 are typically utilized in conjunction with track circuits to prevent the operation of switch 108 when a railway vehicle is within the detection zone. Once configured, inputs MC4 and MC8 will allow operation of switch 108 when both MC4 and MC8 are set, and disallow operation of switch 108 when either input MC4 or MC8 is not set.

One preferred power switch, model LP3000, has a feature for automatically restoring switch 108 to a "normal" position following a reverse movement of a railway vehicle. This option is configurable in software and is triggered by two inputs MC12 and MC13. Input MC12 is used to condition the controller 110 to automatically restore switch 108 to the normal position following a reverse movement of a railway vehicle. Input MC13 is used to trigger the restoration of switch 108 to the normal position. A falling edge (removal of a signal) on input MC13 will trigger the restoration of switch 108 after a configurable, pre-determined, time period. Accordingly, from the forgoing, it is apparent to one of skill in the art how to configure other power switches to achieve the teachings of the present discussion.

Power Switch Modifications

Figure 4B:
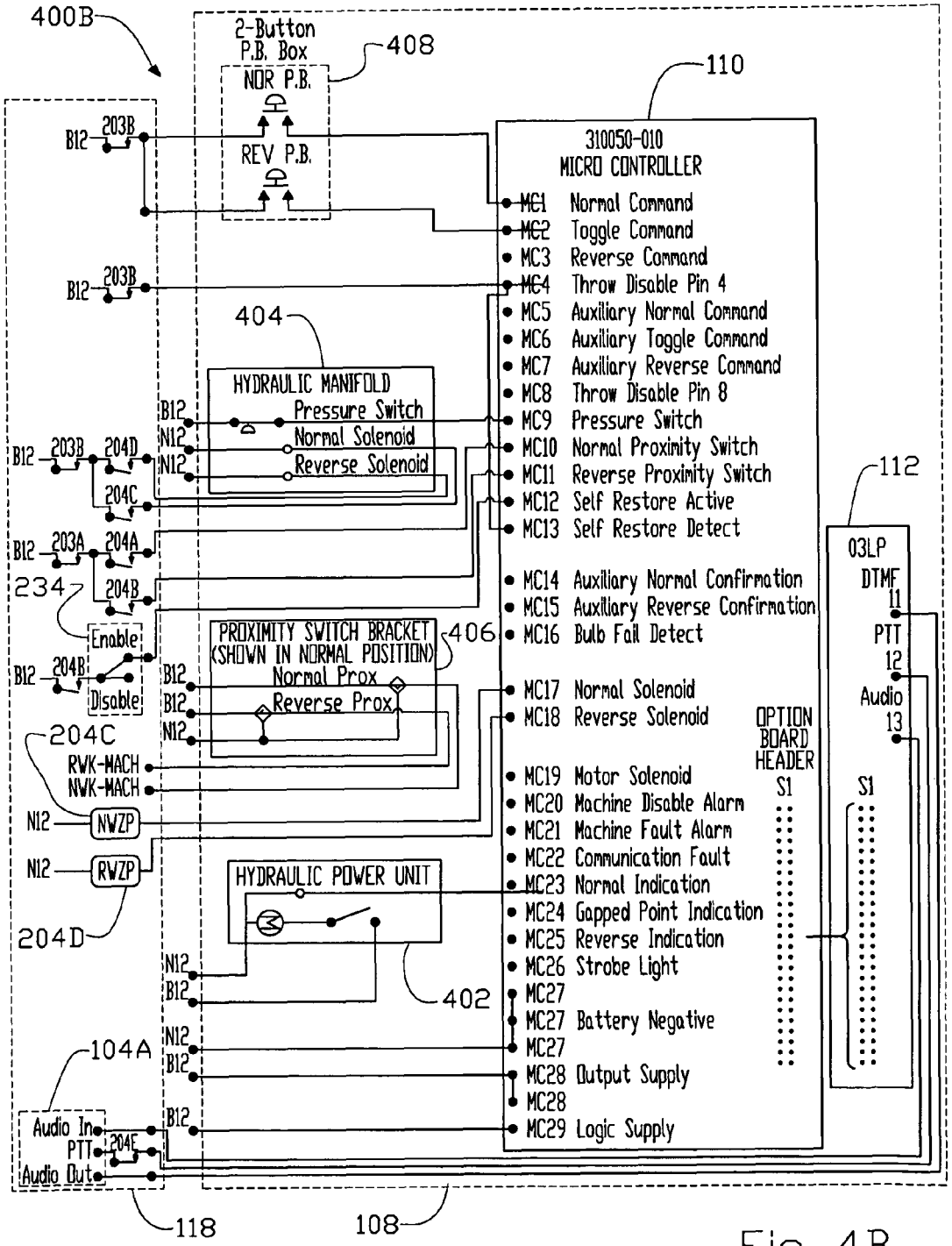

FIG. 4B is a diagram 400B illustrating the application and modifications of switch 108 according to an embodiment. In order to utilize the preferred switch 108 various modifications must be made as follows:

the B12 supply for pushbuttons 408 originates in MCU 118 and is switched by a front contact of relay 203B, the B12 supply for MC4 and MC13 originates in MCU 118 and is switched by a front contact of relay 203B—the signal for MC13 is accomplished by the placement of a jumper from MC4 to MC13, the B12 supply for manifold 404 originates in MCU 118 and is switched by a front contact of relay 203B (the normal solenoid is driven by the switched B12 in a logical AND circuit utilizing a front contact of relay 204D; the reverse solenoid is driven by the switched B12 in a logical AND circuit utilizing a front contact of relay 204C), the B12 supply for inputs MC10 and MC11 originates in MCU 118 and is switched by a front contact of relay 203A (input MC10 is driven by the switched B12 in a logical AND circuit utilizing a front contact of relay 204A; input MC11 is driven by the switched B12 in a logical AND circuit utilizing a front contact of relay 204B), input MC12 is driven by B12 that originates in MCU 118 that is switched by a front contact of relay 204B (the switched B12 is wired through toggle 234 where the circuit is used to either enable or disable the auto restore feature of switch 108; proximity sensors 406 are wired to MCU 118 as inputs, where the normal proximity sensor is NWK-MACH and the reverse proximity sensor is RWK-MACH), and output MC17 is wired to the coil of relay 204C (NWZP) in MCU 118; where output MC18 is wired to the coil of relay 204D (RWZP) in MCU 118, DTMF 112 input 11 is wired through controller 118 to radio 104A, DTMF 112 output 12 is wired through controller 118 to radio 104A and switched by a front contact of relay 204E, and DTMF 112 output 13 is wired through MCU 118 to radio 104A.

Software in controller 110 for switch 108 is typically preconfigured by the manufacturer. Software utilities to modify certain operating parameters are also typically provided by the manufacturer. In one embodiment, controller 110 contains 65 standard configurable parameters and 4 auxiliary configurable parameters related to DTMF 112. Here, the four auxiliary parameters are: QUERY, REVERSE, TOGGLE, and NORMAL. The default setting for the auxiliary parameters is <locked>. Only the NORMAL and REVERSE parameters are modified. Each parameter is modified to a six digit numeric code in the form of XXXXYY, where XXXX represents a unique identification (ID) for the switch, as determined by the railroad, and YY represents the desired code to represent the given control, such as 11 for NORMAL, and 22 for REVERSE. Table 1 shows user-controlled parameters. Other parameters (except those shown in Table 1) remain at factory defaults.

Of course, the prior sections regarding the power switch discuss an exemplary portion of an exemplary embodiment of the invention. It is understood that equivalent portions having equivalent devices and means may be substituted, and are readily apparent to those of ordinary skill in the art after reading this disclosure.

Switch Circuit Controller

Figure 5:
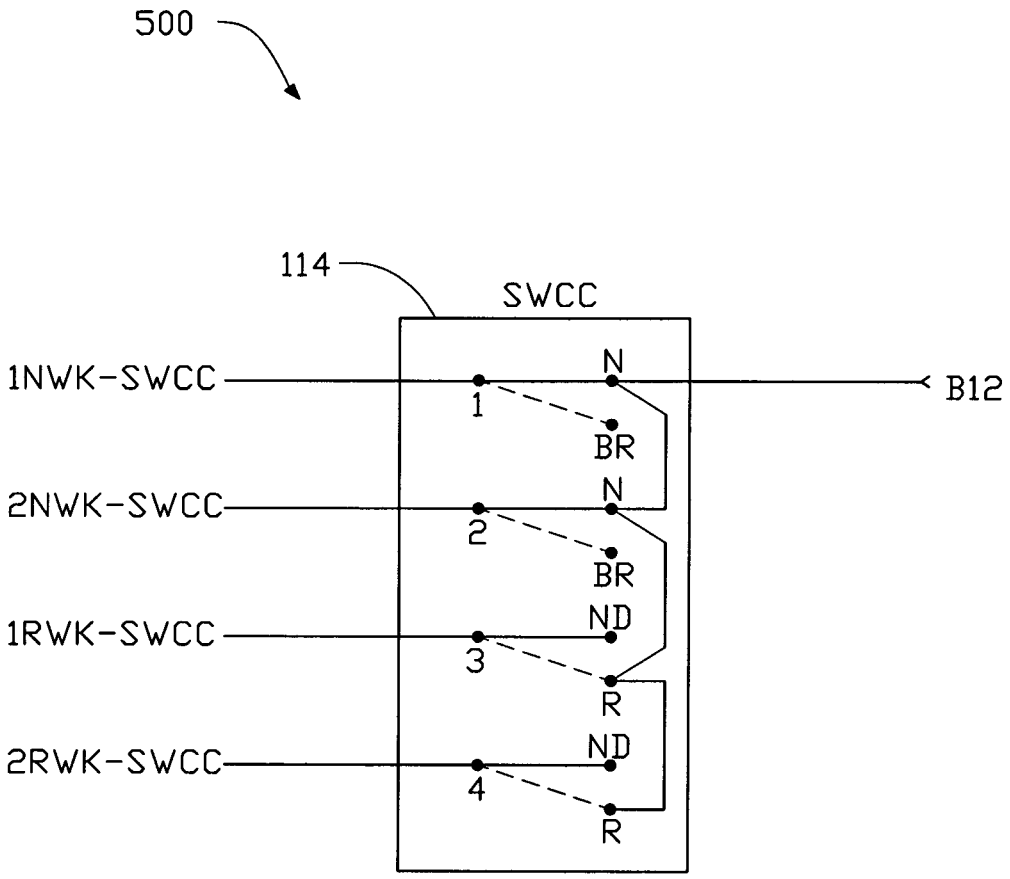

FIG. 5 illustrates the application of an exemplary switch circuit controller 114. Circuit controller 114 is mechanically linked to points 124. Circuit controller 114 operates by closing certain contacts when the points are in various positions. Circuit controller 114 has four outputs, 1 through 4, wired to MCU 118 as 1NWK-SWCC, 2NWK-SWCC, 1RWK-SWCC, and 2WK-SWCC respectively. Circuit controller 114 is utilized to provide an alternate method of determining the position of the points 124 from that provided by switch 108. Contacts of circuit controller 144 operate as follows:

N—Full normal to, but not including, ¼" from normal.

BR—¼" from normal to full reverse.

ND—¼" from reverse to full normal.

R—Full reverse to, but not including, ¼" from reverse

Figure 6:
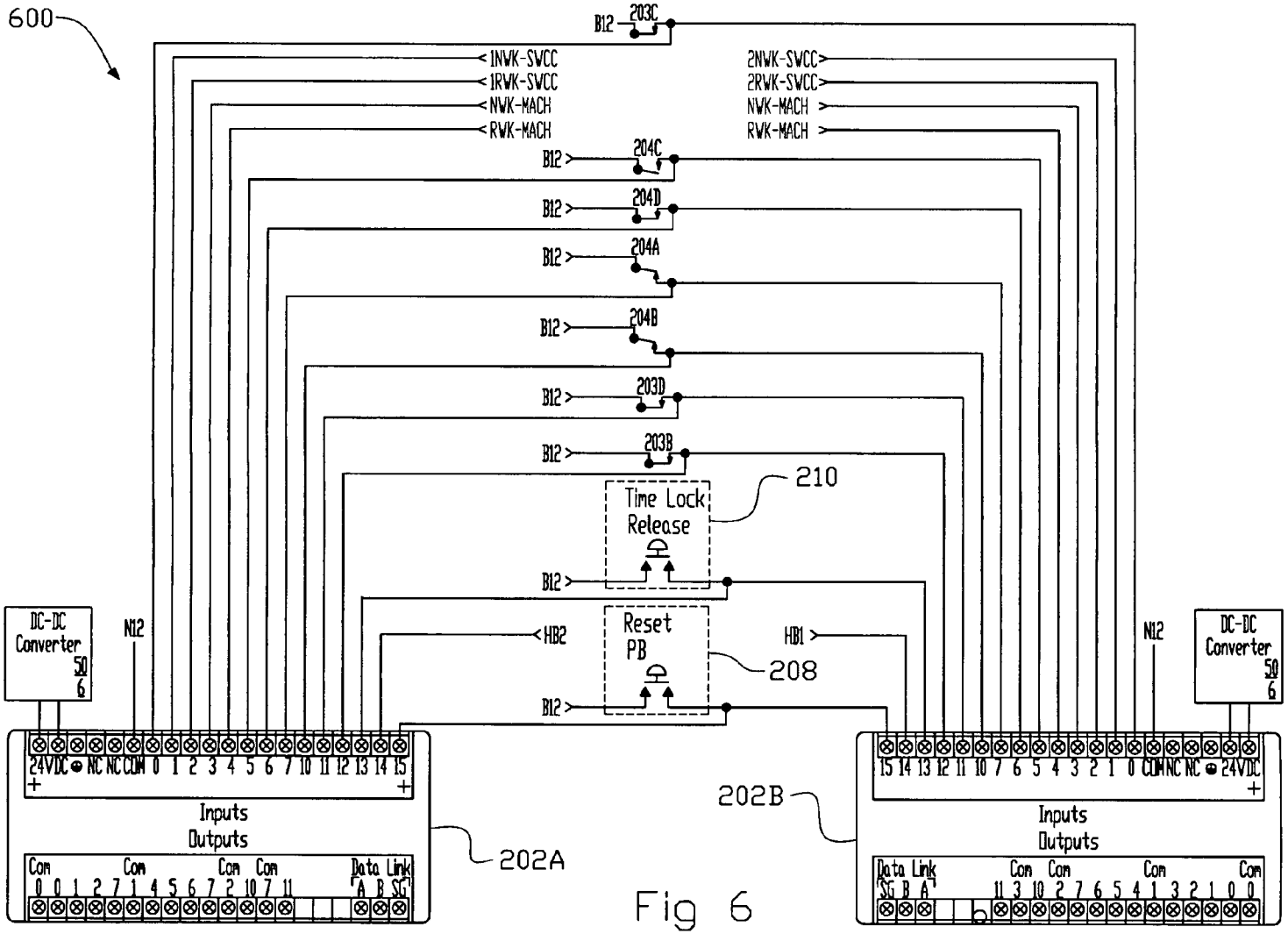

The approach described for a MCU 118 is now continued with reference to FIG. 6. Again, this section discusses an exemplary portion of an exemplary embodiment of the invention. It is understood that equivalent portions having equivalent devices and means may be substituted, and are readily apparent to those of ordinary skill in the art after reading this disclosure.

Input Circuits

FIG. 6 is a diagram 600 that illustrates the inputs for logic controllers 202 according to an embodiment and where inputs for logic controller 202B are shown reflected from their actual position for clarity. Logic controllers 202 inputs operate as either a DC source input, or a DC sink input, according to the wiring of the COM input.

With nomenclature:

| | | | |
|---|---|---|---|
| K | Indication | R | Reverse |
| W | Switch | Z | Control |
| N | Normal | SWCC | Switch Circuit Controller |
| HB | Heart Beat | MACH | Machine |

For each logic controller 202 the COM input line is wired to N12 thereby creating a sink for all inputs. Input 0 of each logic controller 202 is wired to B12 that is switched through a front contact of relay 203C. Input 1 of logic controller 202A is wired to 1NWK-SWCC from circuit controller 114. Input 1 of logic controller 202B is wired to 2NWK-SWCC from circuit controller 114.

Input 2 of logic controller 202A is wired to 1RWK-SWCC from circuit controller 114. Input 2 of logic controller 202B is wired to 2RWK-SWCC from circuit controller 114. Input 3 of logic controllers 202 are wired to NWK-MACH from switch 108. Input 4 of logic controllers 202 are wired to RWK-MACH from switch 108. Input 5 of logic controllers 202 are wired to B12 that is switched through a front contact of relay 204C. Input 6 of logic controllers 202 are wired to B12 that is switched through a front contact of relay 204D. Input 7 of logic controllers 202 are wired to B12 that is switched through a back contact of relay 204A. Input 10 of logic controllers 202 are wired to B12 that is switched through a back contact of relay 204B. Input 11 of logic controllers 202 are wired to B12 that is switched through a front contact of relay 203D. Input 12 of logic controllers 202 are wired to B12 that is switched through a back contact of relay 203B. Input 13 of logic controllers 202 are wired to B12 that is switched through pushbutton 210.

Input 14 of logic controller 202A is wired to output HB2 of logic controller 202B where HB2 is a pulsed output denoting the operational heartbeat of logic controller 202B. Input 14 of logic controller 202B is wired to output HB1 of logic controller 202A where HB1 is a pulsed output denoting the operational heartbeat of logic controller 202A. Input 15 of logic controllers 202 are wired to B12 that is switched through pushbutton 208. Of course, this section discusses exemplary portions of an exemplary embodiment of the invention. It is understood that equivalent portions having equivalent devices and means may be substituted, and are readily apparent to those of ordinary skill in the art after reading this disclosure.

Output Circuits

Figure 7:
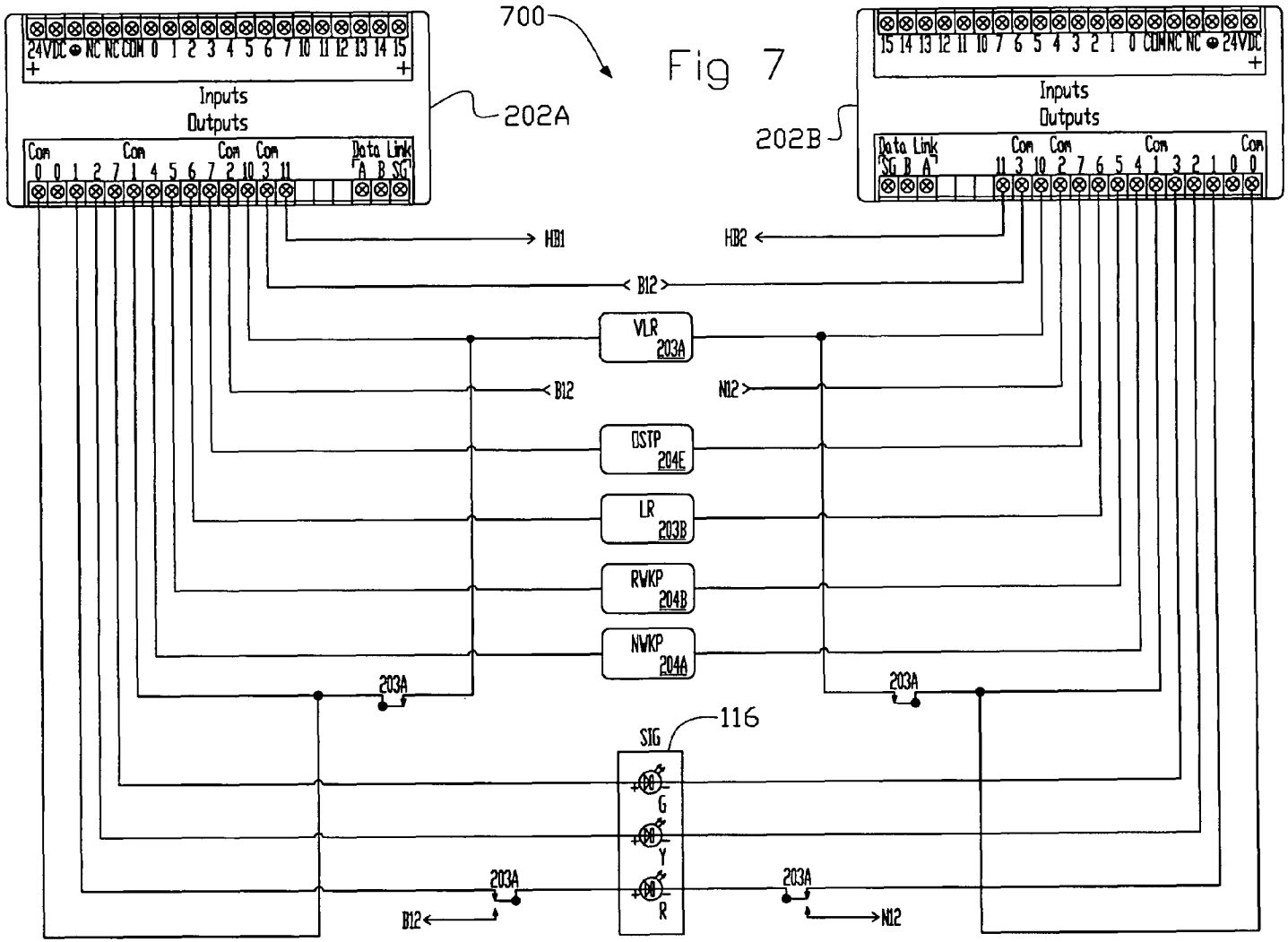

FIG. 7 illustrates the outputs for logic controllers 202 (outputs for logic controller 202B are shown reflected from their actual position for clarity). Outputs for logic controllers 202 operate as DC relays where the outputs operate as either DC source outputs or DC sink outputs depending on the wiring of control inputs. Each logic controller 202 has four control inputs labeled as COM0, COM1, COM3, and COM3, and where COM0 determines the operation of outputs 0, 1, 2, and 3, COM1 determines the operation of outputs 4, 5, 6, and 7, COM2 determines the operation of output 10, and COM3 determines the operation of output 11. All outputs for logic controller 202A are wired as source outputs with COM0, COM1, COM2 and COM3 wired either directly to B12, or wired to B12 through logic circuits. Outputs 0 through 10 of logic controller 202B are wired as sink outputs with COM0, COM1 and COM2 wired either directly to N12, or wired to N12 through logic circuits. Output 11 of logic controller 202B is wired as a source output with COM3 wired to B12.

COM2 of logic controller 202A is wired directly to B12. COM2 of logic controller 202B is wired directly to N12. When output 10 of logic controllers 202 are set a circuit is created driving the coil of relay 203A. Additionally, inputs for COM0 and COM1 of logic controllers 202 are supplied by outputs 10 where output 10 of logic controller 202A is B12 and output 10 of logic controller 202B is N12. For each logic controller 202 COM0 and COM1 are switched through front contacts of relay 203A. A failure of either logic controller to set output 10 will open the circuit for relay 203A thereby opening all circuits for outputs 1 through 7 of logic controllers 202.

Output 0 of logic controllers 202 are not used. Output 1 of logic controllers 202 creates a circuit for the RED aspect of position indicators 116. Outputs 1 of logic controllers 202 are switched through front contacts of relay 203A. Additionally, B12 and N12 is supplied through back contacts of relay 203A creating a circuit for the RED aspect of position indicators 116 when relay 203A is in the open position. Output 2 of logic controllers 202 create a circuit for the YELLOW aspect of position indicators 116. Output 3 of logic controllers 202 create a circuit for the GREEN aspect of position indicators 116. Output 4 of logic controllers 202 create a circuit to drive the coil of relay 204A. Output 5 of logic controllers 202 create a circuit to drive the coil of relay 204B. Output 6 of logic controllers 202 create a circuit to drive the coil of relay 203B. Output 7 of logic controllers 202 create a circuit to drive the coil of relay 204E. Output 10 of logic controllers 202 create a circuit to drive the coil of relay 203A. Output 11 of logic controllers 202 operate as a pulsed output denoting the operational heartbeat of the logic controllers 202. Output 11 of logic controller 202A is denoted as HB1 and is wired to input 14 of logic controller 202B. Output 11 of logic controller 202B is denoted as HB2 and is wired to input 14 of logic controller 202A. Like other sections, this section discusses exemplary portions of an exemplary embodiment of the invention. It is understood that equivalent portions having equivalent devices and means may be substituted, and are readily apparent to those of ordinary skill in the art after reading this disclosure.

PLC Program

One exemplary program for operating a method according to the invention operates in two distinct modes: initialization and operation. The initialization mode is entered when the logic controllers 202 are powered up or a reset signal is received on input 15. During the initialization mode various timers and flags are set to allow the program to achieve a stable operating state. Additionally the program begins generating a periodic heartbeat on output 11. The heartbeat is programmed for a continuous duty cycle of 3 seconds on and 7 seconds off. Each logic controller 202 reads the other logic controllers 202 heart beat on input 14. If during the initialization, or operational modes the received heartbeat is not detected or falls outside of the allowable timing parameters output 10 is turned off thereby opening circuits on outputs 0 through 7. In this state the indicators 116 will display a RED aspect, and switch 108 will be prevented from being controlled by the open circuit on relay 203B. Additionally, during the operating mode program will turn off output 10 under several conditions where an input does not agree with a calculated state or an output. These checks include certain feedback circuits that include inputs 7, 10, and 12.

Once the program initializes it enters the operational mode. During this mode the program executes in a continuous loop that reads the inputs and sets the outputs according to the programmed logic. In addition to the operations already described, the general operation of a system for a remotely controlled switch according to various embodiments is continued. This section discusses an exemplary method of an exemplary embodiment of the invention. It is understood that equivalent methods (and portions of methods) having equivalent or substantially similar ends may be substituted, and are readily apparent to those of ordinary skill in the art after reading this disclosure. To further aid understanding of the invention, program mnemonics are provided with the drawings as the Mnemonics Listing.

Operation

Figure 8:
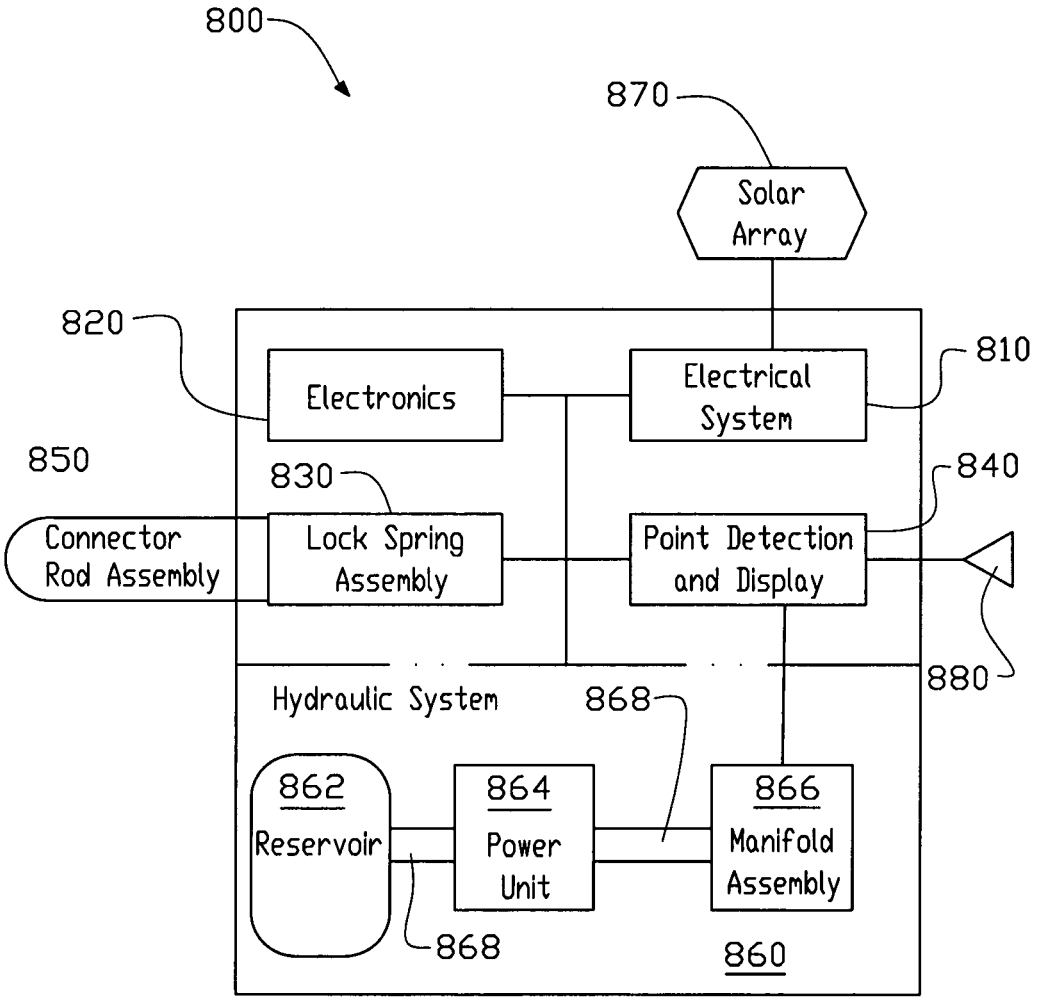

One method according to the invention is shown in FIG. 8 as a switch algorithm 800, which may be practiced as software. The switch algorithm 800 operates by applying both software logic and relay logic to the operation of switch 108. Four goals of the switch algorithm 800 are: to allow the remote control of switch 108, provide feedback on the status of switch 108 to railway personnel, prevent the control of switch 108 when occupied or other operating conditions require, and prevent the control of switch 108 in the presence of a component or logical failure.

Operational control of the switch algorithm 800 begins with a receive wireless command act 810 in which the receipt of a radio dual tone multi-frequency command received by DTMF 112 that is generated by radio 104B. DTMF 112 decodes the message, and once validated to match the programmed codes in a validate codes act 820, the DTMF 112 causes controller 110 to execute the control by setting outputs MC 17 for a NORMAL command, or MC18 for a REVERSE command in a control command act 830. These outputs set relays 204C and 204D, respectively. These relays drive the solenoids of manifold 404 but are switched by relay 203B. Relay 203B is the Lock Relay, set (on) when unlocked and reset (off) when locked. Relay 203B is set only when track circuits 102 are un-occupied, certain software timers are not running, and relay 203A is set (on). If relay 203B is reset, switch 108 is locked and cannot be controlled. Accordingly, in a check relay act 840, relay 203B is queried to determine if it is in a condition for operation. If the switch 203B is in a condition for operation, then the switch algorithm 800 proceeds to a detect correspondence query 850. If the switch 203B is not in a condition for operation, then the relay 203B is in a reset mode and the switch 108 is locked as shown in the relay off act 845.

The software timers that govern the operation of relay 203B may include a 15-minute approach timer. The approach timer is used to lock the switch for 15 minutes after the switch has reached correspondence as indicated by logic controller 202 inputs 1, 2, 3, 4, 5, 6, 7, and 8. As indicated above, while the approach timer is running switch 108 cannot be re-controlled. The approach timer can be slotted off by the occupancy track circuits 102.

When controller 110 detects correspondence as governed by inputs MC10 and MC11 in the detect correspondence query 850, controller 110 causes DTMF 112 to transmit via radio 104A a pre-recorded message—one for normal correspondence and one for reverse correspondence in a transmit act 860. Thus, if controller 110 detects a failure to achieve correspondence within a predetermined time after receiving a control controller 110 causes DTMF 112 to transmit an out of correspondence message on radio 104A in an correspondence failure act 855.

Feedback to railway personnel on the condition of points 124 in provided in a condition indicator act 870, and includes the pre-recorded messages transmitted following a control message and also the display of the aspects for indicators 116. Indicators 116 are normally turned off and are only turned on following the receipt of a control message or if relay 203A is reset (off). The GREEN aspect of indicator 116 is used to indicate the points 124 are in the normal position. The YELLOW aspect of indicator 116 is used to indicate the points 124 are in the reverse position. The RED aspect of indicator 116 is used to indicate points 124 are in an unknown, indeterminate, or illegal, position or the system has suffered a failure. Exemplary failures in the system may include a failure to detect a heartbeat as previously described and failures relating to the states and status of various inputs and outputs.

Thus, the switch algorithm 800 logically validates that all position indications on inputs 1, 2, 3 and 4 are in agreement according to the logically calculated state. Additionally the switch algorithm 800 validates that the state of relay 203B matches the calculated state of output 6. Any failure of the system in either the heartbeat or the calculated states causes the output 10 of logic controllers 220 to be turned off This opens relay 203A and puts the system in the state previously described. Once in this state the system is manually reset in order to allow remote control of switch 108. Similarly, the system is reset by the application of push button 208A.

Of course, it should be understood that the order of the acts of the algorithms discussed herein may be accomplished in different order depending on the preferences of those skilled in the art, and such acts may be accomplished as software, and that equivalent methods (and portions of methods) having equivalent or substantially similar ends may be substituted, and are readily apparent to those of ordinary skill in the art after reading this disclosure.

Exemplary Switch Machine

The switch is preferably an electrically controlled, hydraulically actuated power switch machine. As discussed in more detail below, it uses hydraulic actuation and spring holding to enable it to smoothly throw and directly drive a switch point in a railroad, whether mainline, dark territory, or yard applications. When mated with Global Rail Systems® switch control systems, it can be remotely commanded by VHF radio using DTMF tones, spread-spectrum data radio signal or fiber optic command cable, permitting a broad range of automation.

FIG. 8 is a block-diagram of the switch machine 800. From FIG. 8 it is seen that the switch machine 800 generally includes an electronics system 820 coupled to an electrical system 810. The electrical system 810 generally comprises a battery which may be coupled to an AC powered charge source, as well as the wiring that couples to proximity detectors, a hydraulic motor, and pump manifold.

The electronics system 820 comprises a controller and is adapted to control a lock spring assembly 830, a point detection and display system 840, a connector rod assembly 850, and a hydraulic system 860. The lock spring assembly 830 is coupled to the electrical system 810 and electronics system 820, and includes a spring lever coupled to a spur gear (described below), and is coupled to the hydraulic system 860. The point detection and display system 840 includes at least two proximity sensors mounted to slots in a sensor bracket inside the switch machine 800. Each proximity sensor monitors the location of a metal offset target built into a piston rack-switch connector rod assembly (see FIG. 12). The manner of installation of the sensors depends on the type chosen, and a user should be sure that the sensors are close enough to the target to detect it, but not touch it. The connector rod assembly 850 includes a connector rod, and is integral with the lock spring assembly 830.

The hydraulic system includes a reservoir 862, a hydraulic power unit 864 coupled to the reservoir 862, and a hydraulic manifold assembly 866, as well as related plumbing 868. The hydraulic power unit 864 is adapted to provide a force to move the connector rod, such that the offset target moves away from a normal sensor, and in response, the controller of the electronics system 820 de-energizes signaling switch movement via a direct drive. From FIG. 8 it is also seen that the switch 800 may include a solar array 870 and/or a visual indicator 880.

Figure 9:
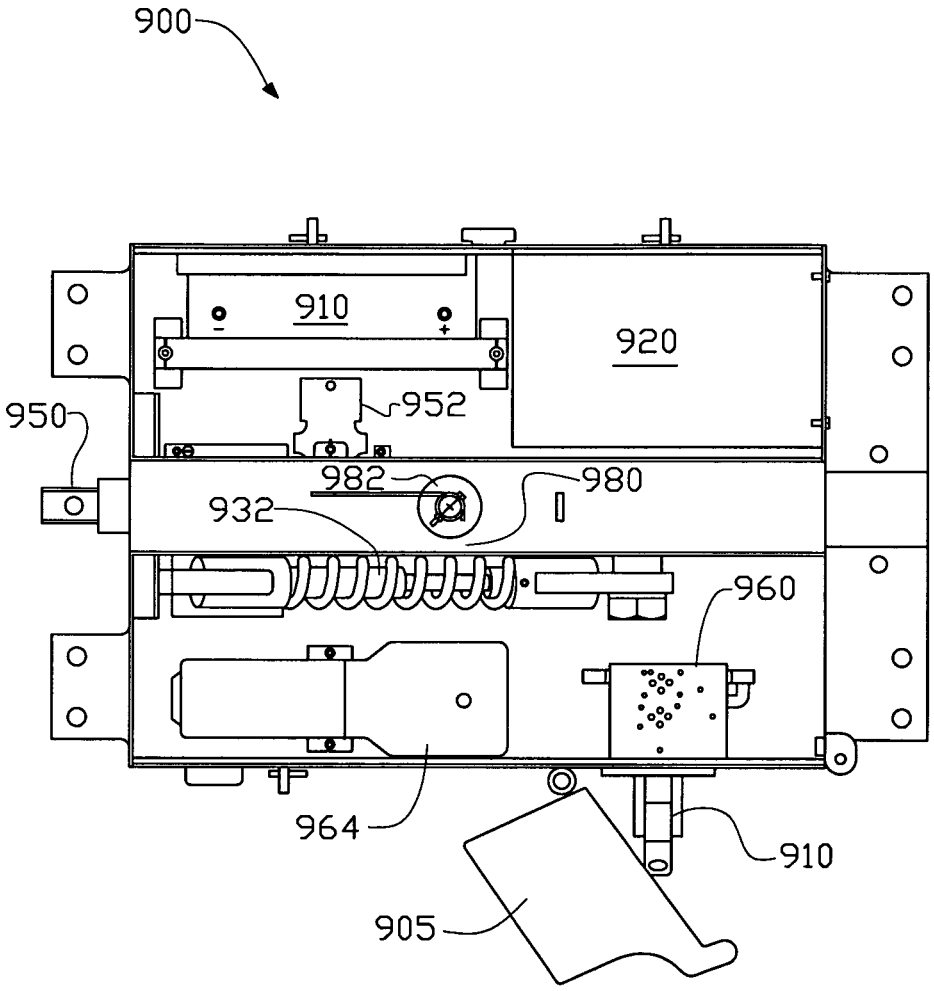

FIG. 9 illustrates a preferred layout of the switch machine 900 discussed in FIG. 8. A weather resilient cover 905 is preferably steel, hinged, and lockable, protects a hydraulic hand-pump 910, which is coupled to the hydraulic manifold 866. The hydraulic manifold 866 is also coupled to the hydraulic power unit 964. The hydraulic power unit 964 is preferably an integral pump motor/fluid reservoir device with a start solenoid attached, and an internal relief valve. In a preferred embodiment, the hydraulic controls within the hydraulic manifold 966 hydraulically isolate the hand pump 910 from hydraulic pressure during a power throw. This prevents unwanted movement of a pump handle if it is in place when the switch 900 is power operated. Preferably, the hydraulic fluid is aviation grade, mineral based, hydraulic oil. The spring lock 932 of the lock spring assembly 930 is likewise coupled to a switch connector rod 950. A stop block 952 is provided. The actuation of the switch machine 900 is controlled by electronics maintained in an electronics tray 920 and powered by a battery 912 of an electrical system. Also seen in FIG. 9 is a visual indicator of the switch position preferably embodied by metallic flags, which is coupled to the metal offset sensor target via a target bearing block 982.

Figure 10:
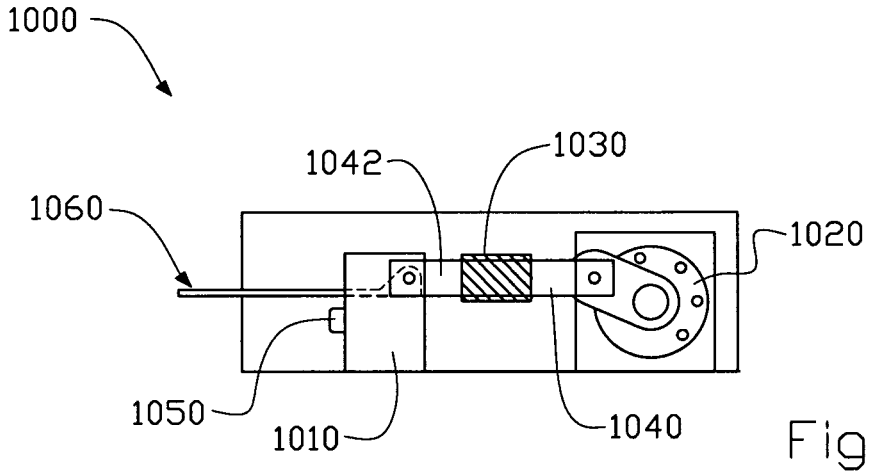

FIG. 10 is an isolated face-on view of a lock spring assembly 1000 of the switch machine discussed in FIG. 8. The lock spring assembly 1000 is mounted to a support block 1010 and coupled to a hydraulically actuated spur gear 1020. A lock spring 1030 is coupled to the support block 1010 and the spur gear 1020 via lock spring clevis 1040, 1042. An adjusting bolt 1050 provides the ability to adjust the spring holding force up to 2000 lbs/907 Kg by repositioning the support block 1010. When the hydraulic power unit is off, there is no hydraulic pressure and the lock spring 1030 provides all of the holding force to the switch points through a switch connector rod 1060.

Figure 11:
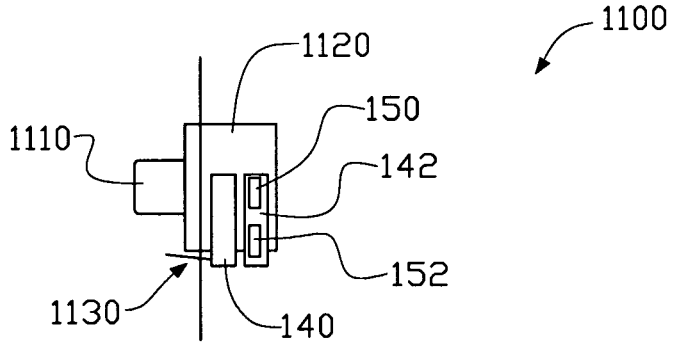

FIG. 11 shows selected top-down detail of a manifold assembly 1100 of the switch machine discussed in FIG. 8. The manifold assembly 1100 provides for both manual and powered changes of switching positions. Manual operation is provided via a hand-actuator pump 1110 coupled to the manifold block 1120, and directional selector lever 1120 coupled to a first directional control valve 140. Powered operation is achieved via a second directional control valve 142 that is electrically controlled by valve control solenoids 150, 152.

Figure 12:
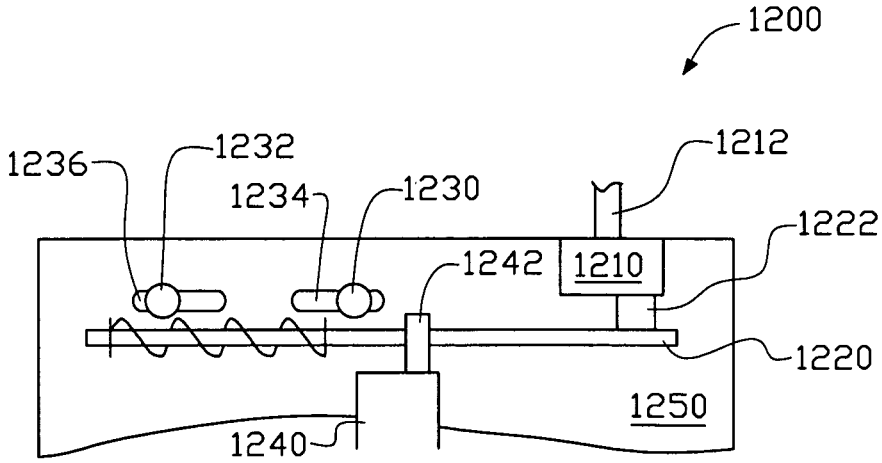

FIG. 12 illustrates isolated detail of a mechanical target drive linkage 1200. A target bearing block 1210 couples a metallic flag pole 1212 to a target drive rod 1220 via a target lever 1222. From FIG. 12, it is seen that the proximity sensors 1230, 1232, are mounted in proximity sensor mounting slots 1234, 1236 of a sensor mounting bracket 1250. An offset target plate 1240 is coupled to the target drive rod 1220 via target plate mount 1242.

The operation of the switch is straight-forward. At rest in a normal position, there is no hydraulic pressure in the system and the lock spring assembly provides all of the holding force necessary to keep the switch points closed. The offset sensor target is under the proximity sensor designated as "normal", and preferably generates a +12V DC output to the switch control. When a "reverse" movement of the switch points is commanded, +12V DC is applied to the appropriate valve control solenoid, and energizing the hydraulic power unit motor start solenoid. The hydraulic power unit provides the hydraulic force needed to move the piston rack-switch connector rod assembly, which is coupled to the track's switch control points. The offset sensor target thus moves away from the "normal" sensor, de-energizing it, which signals switch movement to the control system. As the piston rack moves, the spur gear-spring lever rotates, compressing the lock spring. Through the first half of the switch movement, hydraulic force is needed to overcome the increasing resistance of the lock spring. When the switch points are at half-throw, the spring lever reaches the neutral point, directly lining up with the lock spring. This is the point of maximum spring compression. At the piston rock continues its movement, the spring lever moves past the neutral point and the spring begins to unload, adding its force through the spur gear to the piston rack and helping to close the switch points in the "reverse" position. As the points close, the offset sensor target moves under the "reverse" proximity sensor and energizes its +12 V DC output to the switch control system.

Receiving the reverse sensor input, the control system shuts off the hydraulic power unit and de-energizes the reverse control valve solenoid, removing hydraulic pressure and closing the reverse control valve. Again at reset in the reverse position, the lock spring assembly provides all of the holding force to keep the switch points closed and the switch machine is ready for another throw. The logic control is programmed to monitor proximity sensor indications of switch point position, issue switch movement commands to the hydraulic system, and provide other switch control functions, such as insuring that the switch cannot be thrown while a train is approaching or occupying the switch. Further, the logic control can also command LED signals, as well as broadcasts messages over VHF radio as discussed above.

Furthermore, though the invention has been described with respect to a specific preferred embodiment, many advantages, variations and modifications will become apparent to those skilled in the art upon reading the present application. It is therefore the intention that the appended claims and their equivalents be interpreted as broadly as possible in view of the prior art to include all such variations and modifications.

What is claimed is:

1. A railroad switch machine, comprising:

an electrical system;

an electronics system coupled to the electrical system, the electronics system comprising a controller adapted to control a lock spring assembly, a point detection and display system, a connector rod assembly, and a hydraulic system;

the lock spring assembly is coupled to the electrical system, and [comprises a spring lever coupled to a spur gear,] the lock spring assembly is further coupled to the hydraulic system;

the point detection and display system comprising at least two proximity sensors mounted to a sensor bracket, each proximity sensor corresponds with a location of a target [built into] *associated with* the connector rod assembly, and the target corresponding to at least one of said proximity sensors including at least an offset target;

the connector rod assembly comprising a connector rod;

the hydraulic system comprising a reservoir;

a hydraulic power unit coupled to the reservoir;

a hydraulic manifold assembly coupled to the reservoir;

the hydraulic power unit is adapted to provide a force to move the connector rod, such that when the offset target moves away from a proximity sensor in a "normal" position, the proximity sensor in the normal position is de-energized, to signal a switch movement to the controller, thereby the controller is configured to detect the offset target moving away from the proximity sensor in order to signal the switch movement to the controller.

2. The device of claim 1 wherein the electrical system is coupled to a solar array.

3. The device of claim 1 wherein the hydraulic manifold assembly comprises an electrically operated directional control valve operated by valve control solenoids.

4. The device of claim 1 wherein the hydraulic manifold assembly comprises a manually operated directional control valve.

5. The device of claim 4 further comprising a manual directional selector lever coupled to the manifold assembly.

6. The device of claim 4 further comprising a manual hand pump coupled to the hydraulic manifold assembly.

7. The device of claim 1 wherein the proximity sensors are inductive proximity sensors.

8. The device of claim 1 wherein the connector rod is adjustable.

*9. A railroad switch machine, comprising:*

*a connector rod assembly comprising a connector rod;*

*a hydraulic system connected in-line with the connector rod;*

*a lock spring assembly coupled to the hydraulic system,*

*wherein the lock spring assembly provides an increasing resistive force to the hydraulic system through a first range of movement to a neutral point,*

*wherein the lock spring assembly provides a decreasing resistive force to the hydraulic system through a second range of movement from the neutral point by imparting a force on the connector rod;*

*a point detection and display system comprising at least two proximity sensors,*

*wherein each proximity sensor corresponds with a location of an offset target associated with the connector rod assembly;*

*an electronics system comprising a controller adapted to control the hydraulic system and further connected to the point detection and display system;*

*wherein the hydraulic system provides a force to move the connector rod, such that when the offset target moves away from a proximity sensor in a "normal" position, the proximity sensor in the normal position is de-energized to signal a switch movement to the controller, thereby the controller is configured to detect the offset target moving away from the proximity sensor in order to signal the switch movement to the controller.*

* * * * *